(12) United States Patent
Taylor et al.

(10) Patent No.: US 7,055,386 B2
(45) Date of Patent: Jun. 6, 2006

(54) FLUID LEVEL INDICATOR DIAL ASSEMBLY WITH MAGNETIC CALIBRATION FEATURE

(75) Inventors: Carl A. Taylor, Carrollton, TX (US); Dan E. Swindler, Round Rock, TX (US)

(73) Assignee: Rochester Gauges, Inc., Dallas, TX (US)

( * ) Notice: Subject to any disclaimer, the term of this patent is extended or adjusted under 35 U.S.C. 154(b) by 465 days.

(21) Appl. No.: 10/361,286

(22) Filed: Feb. 10, 2003

(65) Prior Publication Data

US 2004/0154393 A1 Aug. 12, 2004

(51) Int. Cl.
  *G01F 23/36* (2006.01)
  *G01F 23/52* (2006.01)
  *G01F 23/60* (2006.01)

(52) U.S. Cl. ............... 73/313; 73/305; 73/319; 73/290 R; 116/291

(58) Field of Classification Search ............ 73/313, 73/305, 319, 290 R; 116/200, 223, 227, 229
See application file for complete search history.

(56) References Cited

U.S. PATENT DOCUMENTS

| 4,416,211 A | * | 11/1983 | Hoffman | 116/204 |
| 4,543,730 A | | 10/1985 | Scott | 33/366 |
| 5,121,109 A | | 6/1992 | Murphy, Jr. et al. | 340/688 |
| 5,463,314 A | | 10/1995 | Mueller et al. | 324/146 |
| 5,479,820 A | * | 1/1996 | Fekete | 73/319 |
| 5,608,386 A | | 3/1997 | Murphy, III et al. | 340/688 |
| 6,041,650 A | * | 3/2000 | Swindler et al. | 73/317 |
| 6,089,086 A | * | 7/2000 | Swindler et al. | 73/317 |
| 6,253,611 B1 | | 7/2001 | Varga et al. | 73/319 |
| 6,312,074 B1 | | 11/2001 | Walker | 347/7 |
| 6,523,406 B1 | * | 2/2003 | Housey et al. | 73/317 |
| 6,675,648 B1 | * | 1/2004 | Housey et al. | 73/317 |
| 2002/0088278 A1 | | 7/2002 | Ross, Jr. | 73/290 R |

\* cited by examiner

*Primary Examiner*—Hezron Williams
*Assistant Examiner*—Rodney Frank
(74) *Attorney, Agent, or Firm*—Hitchcock Evert LLP

(57) ABSTRACT

A dial assembly with magnetic calibration feature adapted for use as part of a gauge assembly for measuring fluid levels in cryogenic applications is disclosed. The dial assembly includes a base, a pivot pin extending from the base, a pointer assembly pivotally mounted on the pivot pin, and a calibration magnet with adjustment feature. The pointer assembly includes a pointer coupled with a pointer magnet. The calibration magnet with adjustment feature is magnetically coupled to the pointer magnet and adapted to adjust a position of the pointer magnet and therefore the pointer relative to volume indicia on a dial face of the dial assembly. In operation, a movement of the calibration magnet induces a movement in the pointer magnet. The adjustment feature is coupled to the calibration magnet such that it is manipulatable even when the dial assembly is mounted on a gauge head of a gauge assembly installed on a vessel. Further, the dial assembly preferably also includes a pivot pin adjustment feature for repositioning the pointer assembly relative to the dial face.

29 Claims, 8 Drawing Sheets

FLUID LEVEL INDICATOR DIAL ASSEMBLY WITH MAGNETIC CALIBRATION FEATURE

FIELD OF THE INVENTION

The invention relates to dial assemblies for use with liquid level gauges, and in particular, dial assemblies for use with gauges for measuring a fluid level in a vessel in cryogenic liquid applications. More particularly, the invention relates to dial assemblies which are easily calibrated.

BACKGROUND OF THE INVENTION

Known gauge assemblies 20, such as illustrated in FIGS. 1 and 2 and disclosed in U.S. Pat. No. 5,479,820 to Fekete include a known dial assembly 22 and a known float assembly 24. Together, the dial assembly and float assembly produce a complete gauge assembly. For additional details, U.S. Pat. No. 5,479,820 to Fekete is hereby incorporated by reference herein in its entirety.

Referring now to FIGS. 1 and 2, for background, a known float assembly 24 has two major components: lift assembly 26 and a gauge head 28. The gauge head 28 defines a passageway 30 having a first end 32 and a second end 34 and is provided with threads 36 adjacent the second end 34 for screwing the gauge head 28 onto a wall of a vessel (shown in phantom in FIG. 1 only). Passageway 30 of gauge head 28 receives the upper portion of lift assembly 26 in a slidable fashion.

A known lift assembly 26 includes a lift rod 38 with a first end 40 and a second end 42 and a float 44 or displacement member, is coupled to the second end 42 of the lift rod 38 in a manner such that a movement of the float 44 induces a resulting motion of the lift rod 38 along longitudinal axis of the passageway 30 of the gauge head 28. Attached at the first end of the lift rod 38 is a lift magnet 46. The passageway 30 of the gauge head 28 receives the first end of the lift rod 38 and the lift magnet 46 attached thereto. As a liquid level in a vessel changes, the float 44 changes position. This in turn moves the lift rod 38 of the lift assembly 26 and thereby the lift magnet 46 along an axis of the passageway 30. Preferably, the first end 40 of the lift rod 38 has a bearing or camming surface 48 for sliding contact with the wall of passageway 30. Bearing surface 48 does not have to be in contact with the wall of passageway, and preferably, a space is provided between the upper end of lift rod 38 and the wall of the passageway 30 to allow for easy movement.

A known dial assembly 22 includes a casing 50 or base having a first side 52, including a dial face (not illustrated) having volume indicia (not illustrated), and a second side 54 having an attachment means 55 for attaching the dial assembly 22 to a gauge head 28. A pointer assembly 60 having a pointer 62 and pointer magnet 64 is rotatably mounted on a pivot pin 66 on the first side 52 of the dial assembly 22. The known dial assembly 22 attaches to a gauge head 28 such that the pointer magnet 64 and the lift magnet 46 are magnetically coupled, whereby a movement of the lift magnet 46 (induced by a movement of the lift rod 38 in the vertical direction induced by a movement of the float 44 as the fluid level in a vessel changes) induces a movement of the pointer magnet 64 which thereby repositions the pointer 62 relative to volume indicia on the dial face.

The known gauge assembly 20 has two calibration features that allow the gauge to be used with different types of fluids. One feature is adjusting the float 44 position at different positions relative to the lift rod 38 and the second feature is adjusting a position of the known dial assembly 22 relative to the gauge head 28. The first feature is most useful prior to attachment of the gauge assembly 22 to the vessel and is set with respect to the fluid to be measured. Once the gauge assembly is mounted to a vessel, it is inconvenient to remove it for adjustment. Thus, a second calibration feature which does not require removal of the gauge assembly has been used.

As illustrated in FIG. 1, the second feature is an adjustment nut 68. The known dial assembly 22 is calibrated by turning the nut 68 attached to a threaded upper portion of the known gauge head 28 thereby raising or lowering the pointer magnet 64 of the known dial assembly 22 relative to the lift magnet 46 of the known float assembly 24.

The disadvantage of this approach is that it requires the upper end of the gauge head 28 to be threaded and have an adjustment feature. Most conventional heads do not have threads on the outer portion to receive the dial adjustment feature of the Fekete device. Thus, there has been a need for a method and apparatus which permits calibration of the dial assembly which does not require a specially threaded gauge head. Another disadvantage of the gauge illustrated in FIG. 1 is that the adjustment nut 68 is highly visible and users may mistakenly turn the nut thinking it is for a purpose other than calibration and unintentionally change the gauge calibration.

While development of alternate methods of positioning a dial assembly 22 vertically relative to the gauge head 28 are also possible without modification to the gauge head 28, these methods may require significant additional room in the dial assembly 22 and add several complex, easily misaligned, exposed parts to the assembly. Further, the size of the known dial assembly is limited by the constraints of the particular dimensions of any one particular vessel or for use with one particular float assembly for which it was designed.

Thus, there is a need for a dial assembly that can be quickly and easily calibrated, recalibrated while positioned on a vessel, and which can be used with any known gauge head and any known float assembly, on any of a variety of dimensioned vessels, and with any of a variety of liquids with different densities without requiring repositioning of the dial assembly relative to the gauge head and without requiring modification to the gauge head.

SUMMARY OF THE INVENTION

A dial assembly with magnetic calibration feature for use with a liquid level gauge assembly for measuring liquid levels in a vessel and adapted primarily for use in cryogenic applications generally includes: a casing or base having a first side and a second side, a pivot pin extending from the first side of the casing, a pointer assembly including a pointer or indicating arm coupled to a pointer magnet mounted pivotally about the pivot pin, and a calibration magnet movably attached to the casing. The dial assembly with magnetic calibration feature further includes an attachment device for attaching the dial assembly about a gauge head of a gauge assembly. Preferably, a dial face with volume indicia is positioned on the first side of the casing.

The calibration magnet is moveably positionable preferably within a recess or slot defined in the casing. The location and orientation of the recess is adapted such that when the calibration magnet is inserted into the recess, it is positioned magnetically operatively adjacent to the pointer magnet in such a way such that a repositioning of the calibration magnet induces a change of position in the pointer magnet and thereby a change of position of the pointer relative to the volume indicia on the dial face.

The dial assembly with magnetic calibration feature further preferably includes an adjustment mechanism cooperatively associated with the calibration magnet. The adjustment mechanism is positioned such that it is at least accessible and operatively manipulatable when the dial assembly is installed on a vessel. The calibration magnet is operatively retained within the recess by a retaining feature. Additionally, the dial assembly includes a gauge crystal having a substantially clear or see-through panel, positionable about the first side of the casing such that the pointer assembly is enclosed between the gauge crystal and the casing, yet remains substantially visibly unobstructed by the gauge crystal panel.

The various embodiments can be adapted to utilize any of a variety of shapes of calibration magnet including a "wafer" magnet and a bar magnet. Additionally, an embodiment can be envisioned also including an adjustable pivot pint whereby the position of the pointer magnet relative to the lift magnet and the calibration magnet can be adjusted even when the dial assembly is secured on a float assembly of a gauge assembly.

FIGURES

Figure 12:
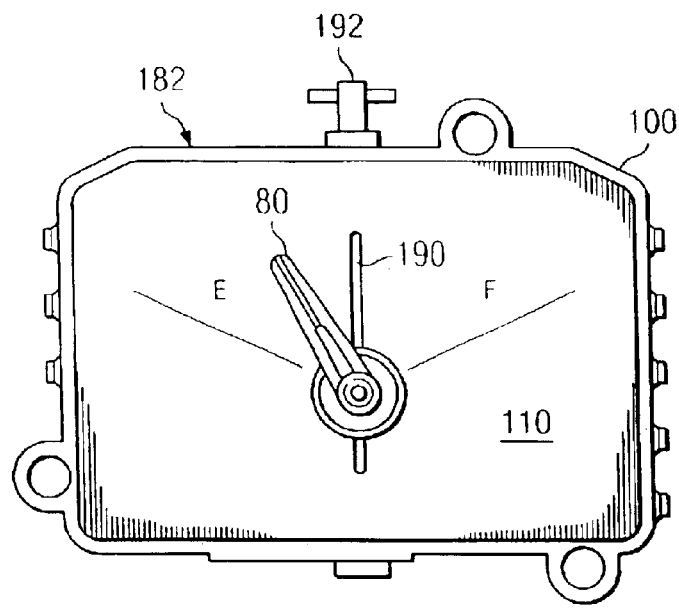
Figure 13:
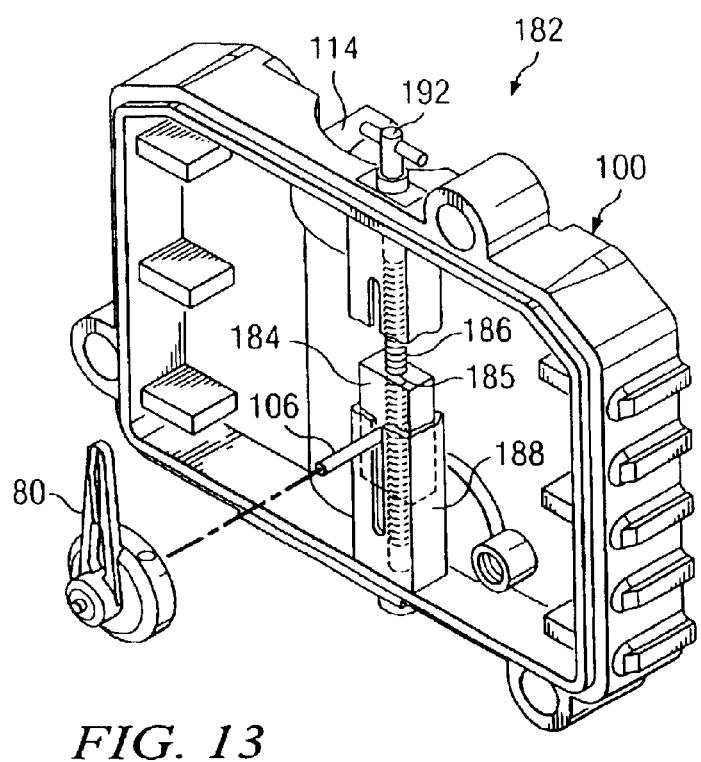

FIG. 12 illustrates a front view of the dial face of a fifth embodiment of a dial assembly with magnetic calibration feature having an adjustable pointer; and FIG. 13 is a perspective view of the casing including the internal operational components of the adjustable pointer of the fifth embodiment of the dial assembly with magnetic calibration feature having an adjustable pointer as illustrated in FIG. 12.

DESCRIPTION

Figures 1, 2:
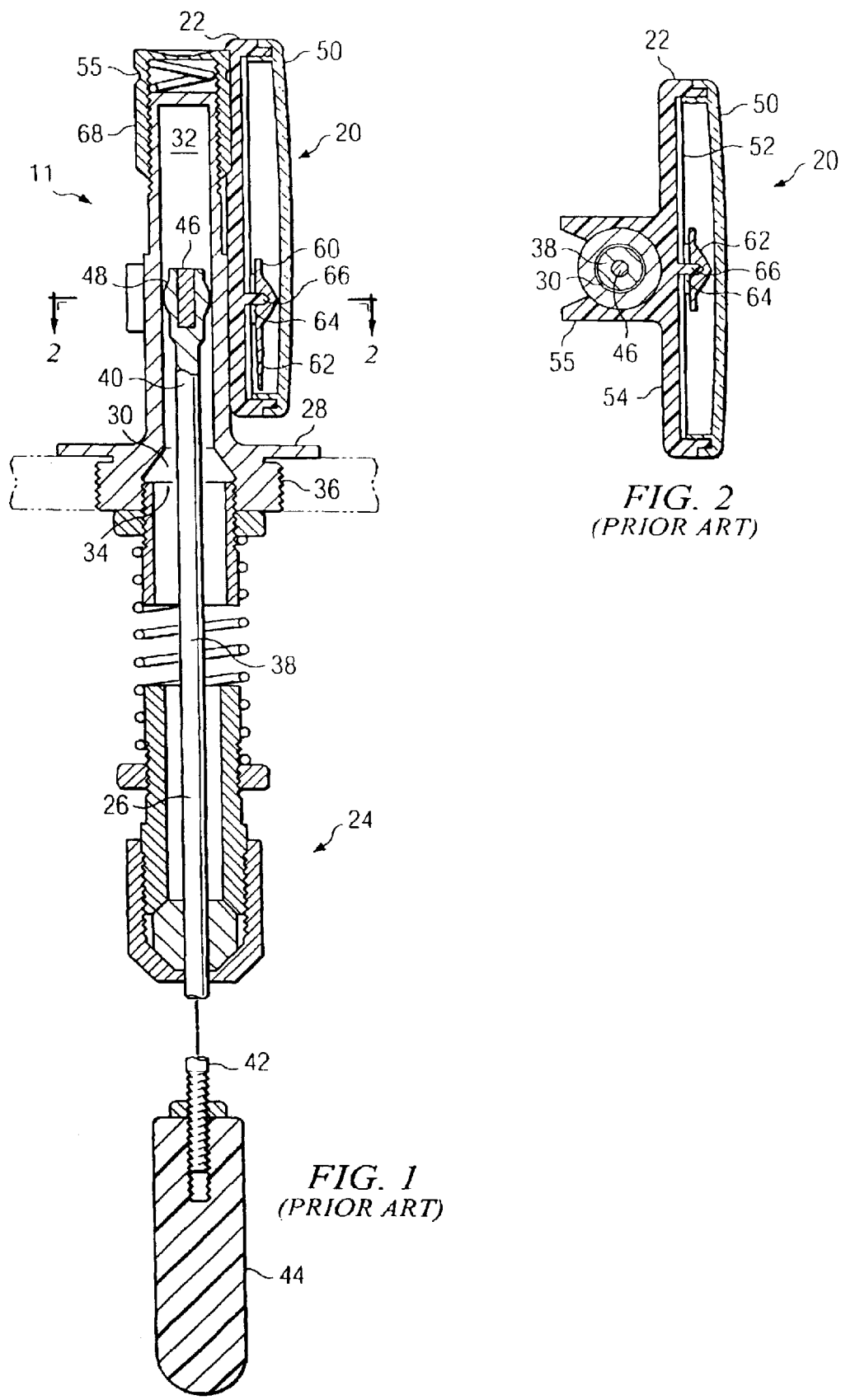
FIG. 1 is a broken cut-away view illustrating a prior art gauge assembly.
FIG. 2 illustrates a cross-sectional view of the prior art gauge assembly of FIG. 1 taken along line 2—2 through the dial assembly.
Figure 3:
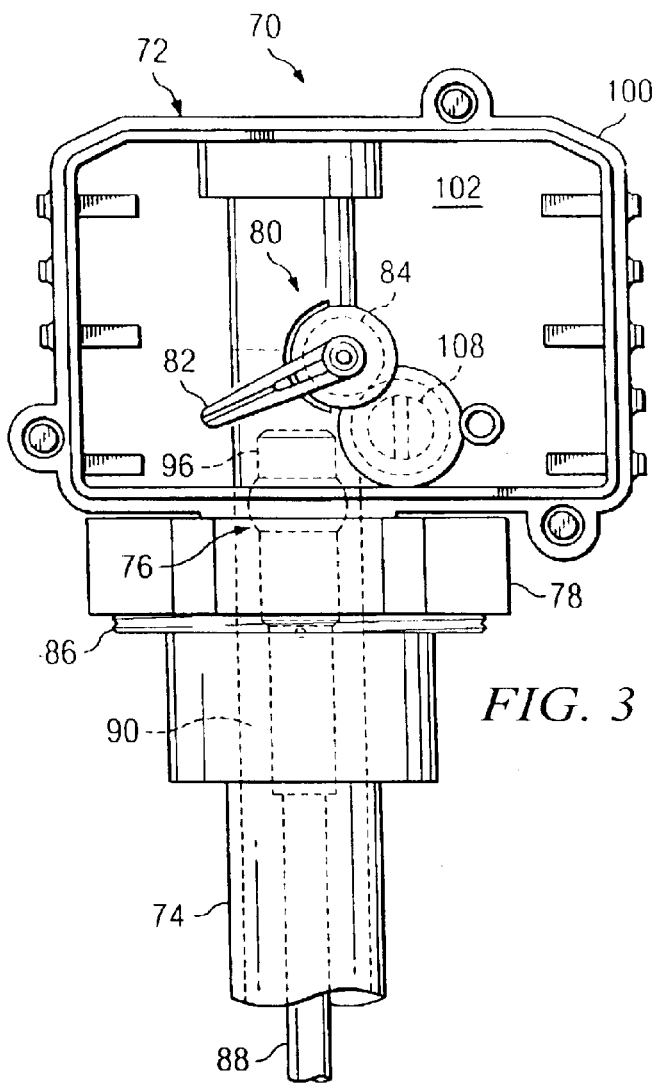
FIG. 3 illustrates a gauge assembly utilizing a first embodiment of a dial assembly with magnetic calibration feature designed in accordance with the present invention installed on a gauge head.

FIG. 3 illustrates the operational parts of a complete gauge assembly 70 utilizing a first embodiment of a dial assembly with magnetic calibration feature 72 designed according to the present invention such that it can be magnetically calibrated while installed on a vessel (not illustrated). The dial face 110 with volume indicia 112 is not illustrated in FIG. 3 in order to show other parts of the invention. The gauge assembly 70 of one embodiment of the dial assembly with magnetic calibration feature 72 is adapted primarily for use in cryogenic applications. The gauge assembly 70 includes a float assembly 74 (illustrated in part only), including a lift assembly 76 and a gauge head 78, and a dial assembly 72. The dial assembly 72 includes a pointer assembly 80 including a pointer 82 coupled with a pointer magnet 84 (shown in hidden lines). The dial assembly 72 is adapted to be secured to the gauge head 78 of the float assembly 74 to form the complete gauge assembly 70. The gauge head 78 is provided with threads 86 to secure the gauge head to corresponding threads on a vessel (not illustrated). The lift assembly 76 includes a lift rod 88 having a lift magnet 96 at one end. The gauge head 78 of the float assembly 74 defines a passageway 90 adapted to receive the lift rod 88 of the lift assembly 76 such that the lift magnet 96 is in magnetic relation to the pointer magnet 84 when the dial assembly 72 is installed on a gauge head 78 of a float assembly 74. As the lift rod 88 moves linearly within the passageway 90, the lift magnet 96, which is operatively magnetically adjacent the pointer magnet 84 with respect to the gauge assembly 70, is moved in relation to the pointer magnet 84 thereby magnetically repositioning the pointer magnet 84 and thereby the attached pointer 82.

As illustrated in FIGS. 4–8, generally, the dial assembly with magnetic calibration feature 72 includes a casing or base 100 having a first side 102 and a second side 104, a pivot pin 106 extending from the first side 102 of the casing 100, a pointer assembly 80 including a pointer 82 coupled to a pointer magnet 84 mounted pivotally about the pivot pin 106 through a central opening 107 defined in the pointer magnet 84, and a calibration feature 109 including a calibration magnet 108 movable with respect to casing 100. Preferably, a dial face 110 with volume indicia 112 is provided on the first side 102 of the casing 100 (illustrated for the fourth embodiment in FIG. 11 only). In the illustration, the magnet and pointer are separated. However, a one piece device having both the pointer and magnet can instead be used. In a preferred embodiment, the pointer and pointer magnet can be a shaped magnet that can be used in conjunction with a Hall detector as described in U.S. Published Application No. 2002/0088278-A1 "Liquid Level Gauge With Removable Hall Device," which is incorporated herein by reference.

The dial assembly with magnetic calibration feature 72 further includes an attachment device 114 for attaching the dial assembly 72 about a gauge head of a gauge assembly. Preferably, the attachment device 114 has gripping members 116 which project outward from the second side 104 of the casing 100, and that preferably operatively attach the dial assembly 72 to the gauge head by means of friction fit. Alternatively, other attachment means now know or which may be later developed can be utilized without deviating from the scope of the invention. These means include: a screw-on attachment, a boyonnet attachment, an adhesive attachment, etc.

Figure 4:
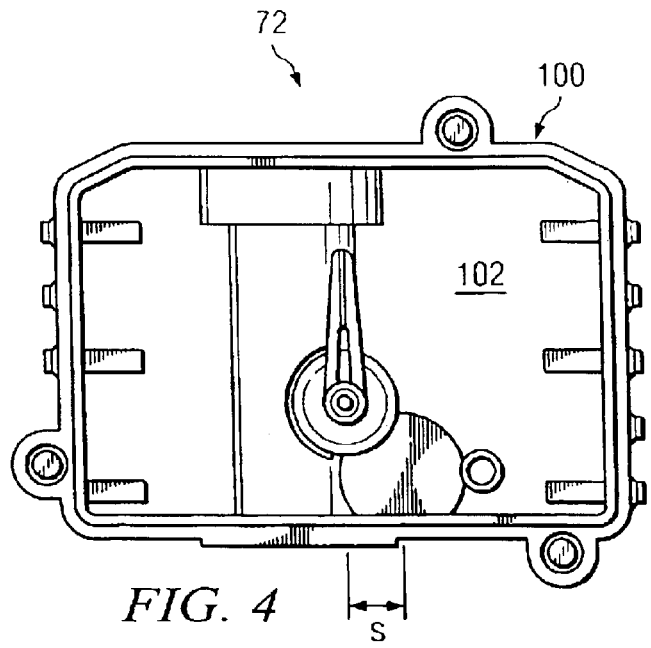
FIG. 4 illustrates a front view of the casing with pointer of the first embodiment of the dial assembly with magnetic calibration feature of FIG. 3.
Figure 5:
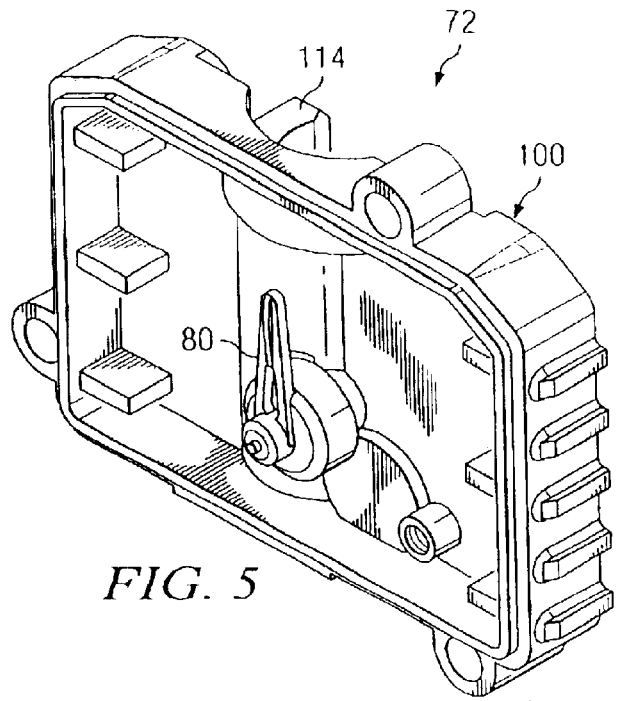
FIG. 5 illustrates a front perspective view of the casing with pointer illustrated in FIG. 4.
Figure 6:
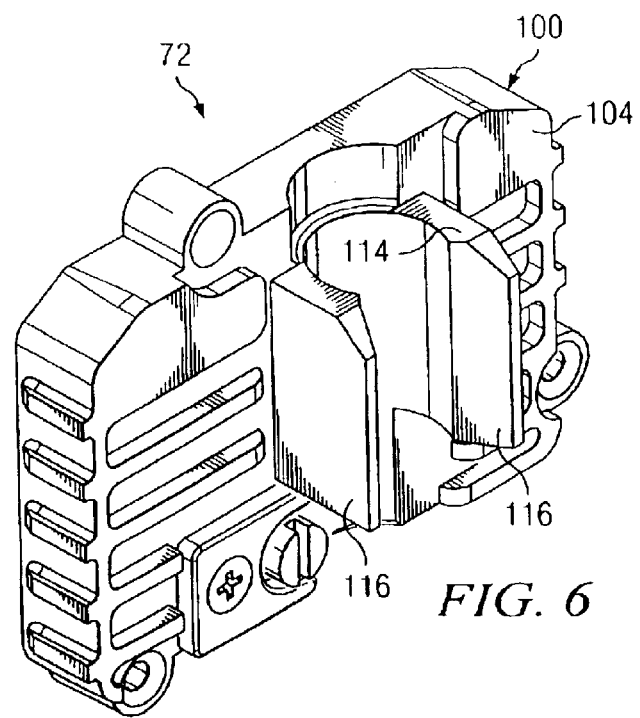
FIG. 6 illustrates a rear perspective view of the casing with pointer illustrated in FIG. 4.

According to the first embodiment of the dial assembly with magnetic calibration feature 72, the calibration magnet 108 is moveably positionable within a recess 118 defined in the casing 100. Alternatively, a slot or recessed channel can instead be provided. The location and orientation of the recess 118 is adapted such that the calibration magnet 108 is positioned magnetically operatively adjacent to the pointer magnet 84 in such a way such that a repositioning of the calibration magnet 108 induces a change of position in the pointer magnet 84 and thereby a change of position of the pointer 82 relative to volume indicia on the dial face. Preferably, the pointer assembly 80 also includes a washer 120 or the equivalent separating the pointer magnet 84 from the casing 100 to facilitate movement of the pointer magnet 84 relative to the casing 100. As illustrated in FIG. 4, preferably, the center of the calibration magnet is adapted to be positioned a distance "S" from the pointer magnet. It is this distance "S" and the magnetic strength of the calibration magnet in relation to the magnetic strength of the pointer magnet and the lift magnet which determines the sensitivity of the refinement of the magnetic calibration feature.

The magnetic calibration feature 109 of the dial assembly with magnetic calibration feature 72 further includes an adjustment mechanism 122 cooperatively associated with the calibration magnet 108. Preferably, the adjustment mechanism 122 is positioned such that it is at least accessible and operatively manipulatable when the dial assembly 72 is installed on a vessel. Preferably, the calibration magnet 108 is operatively retained within the recess 118 by a calibration magnet retaining member 124. Additionally, the dial assembly 72 preferably includes a gauge crystal 126 having a substantially clear or see-through panel 128, positionable about the first side 102 of the casing 100 such that the pointer assembly 80 is enclosed between the gauge crystal 126 and the casing 100, yet remains substantially visibly unobstructed by the gauge crystal panel 128.

Figure 7:
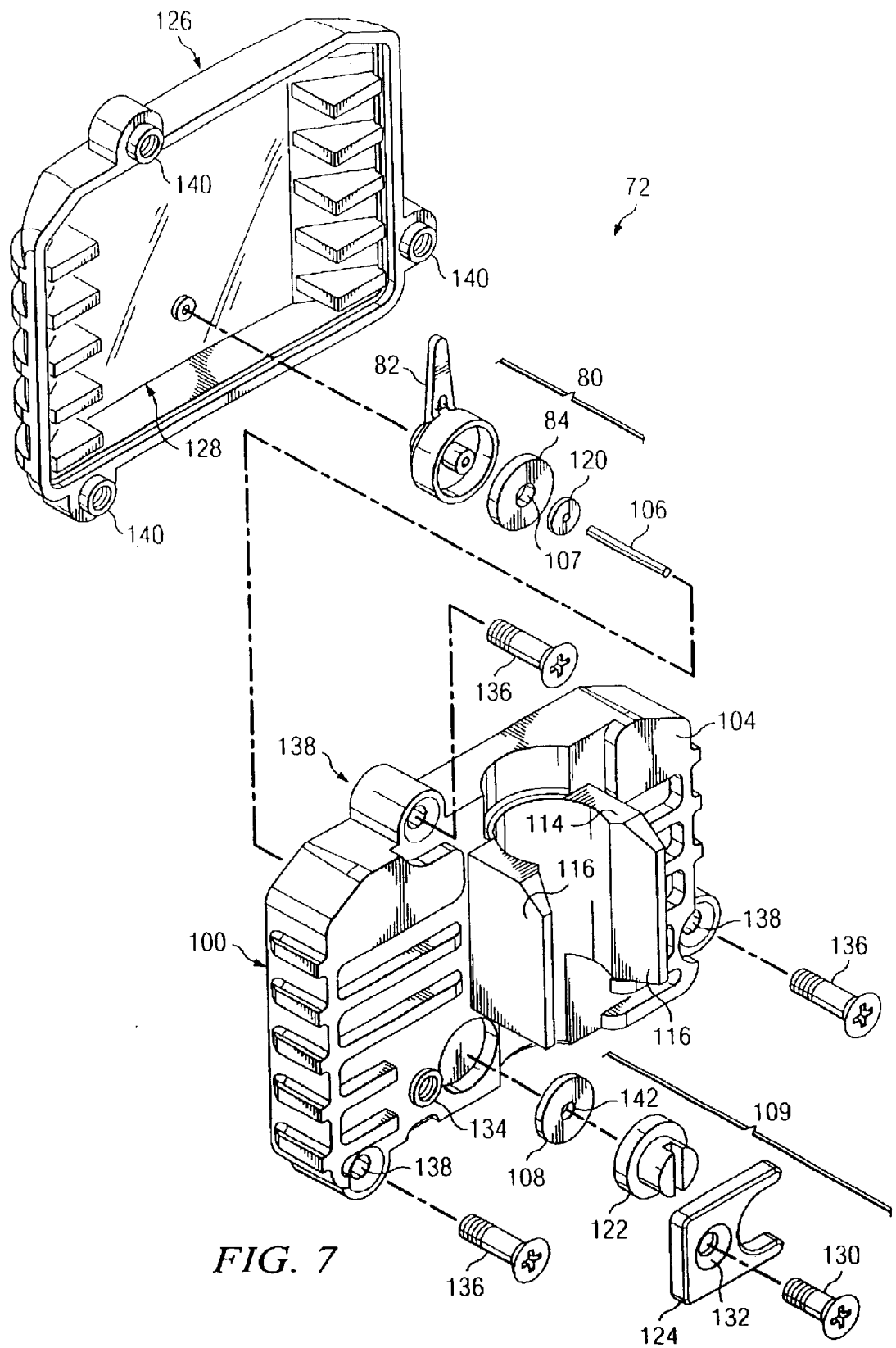
FIG. 7 illustrates a rear exploded view of the first embodiment of the dial assembly with magnetic calibration feature illustrated in FIG. 3 and including a gauge crystal.

As illustrated in FIG. 7, the retaining member 124 is preferably secured by a screw 130 to the casing 100 through an opening 132 defined in the retaining member 124 into a threaded opening 134 in the casing 100. Likewise, the gauge crystal 126 is secured by screws 136 to the casing 100 through corresponding threaded openings 138, 140 defined in the casing 100 and the gauge crystal respectively. Alternatively, the calibration magnet retaining member 124 and the gauge crystal 126 can be secured to the casing 100 using another type of securing fastener, adhesive, or other means now known or later invented, preferably such that they can be disassembled and reassembled if desired.

Figure 8:
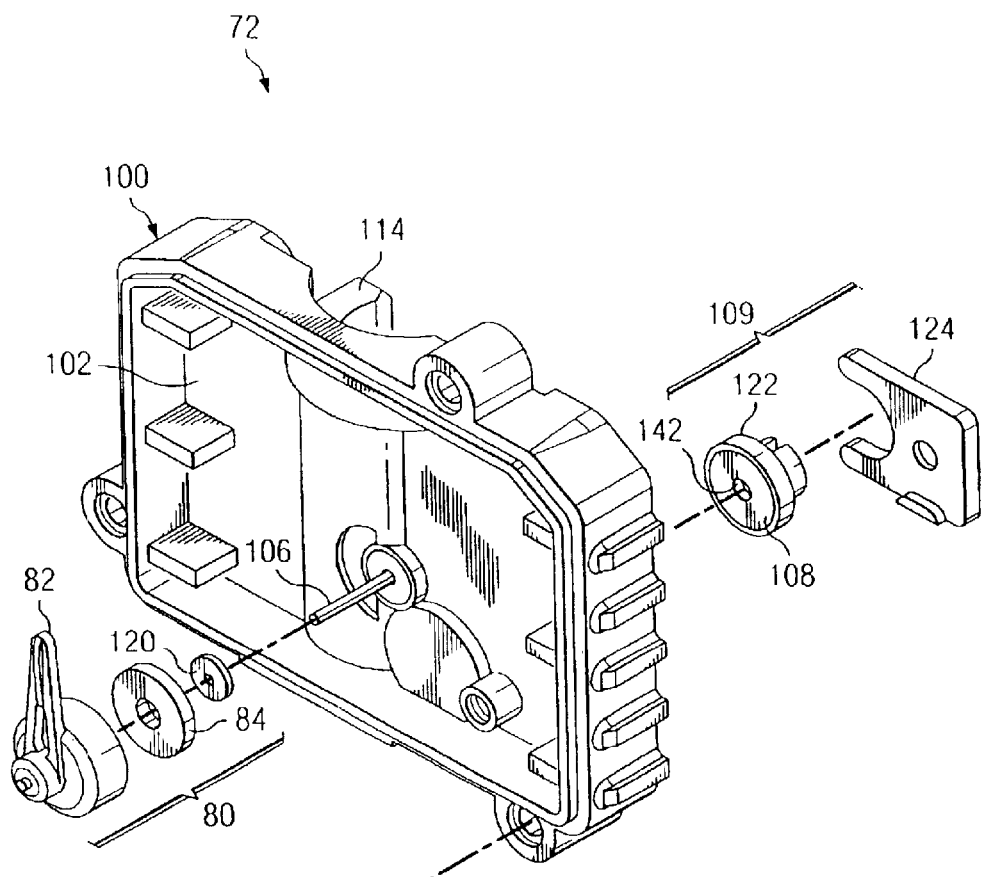
FIG. 8 illustrates a front exploded view of the first embodiment of the dial assembly with magnetic calibration feature illustrated in FIG. 3 and including a gauge crystal.
Figure 8:
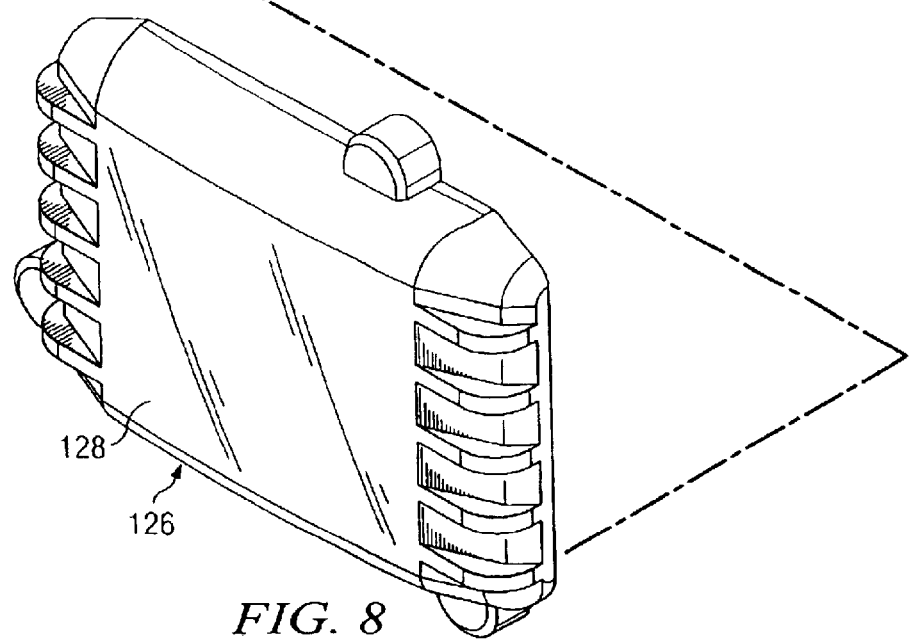
Figure 9:
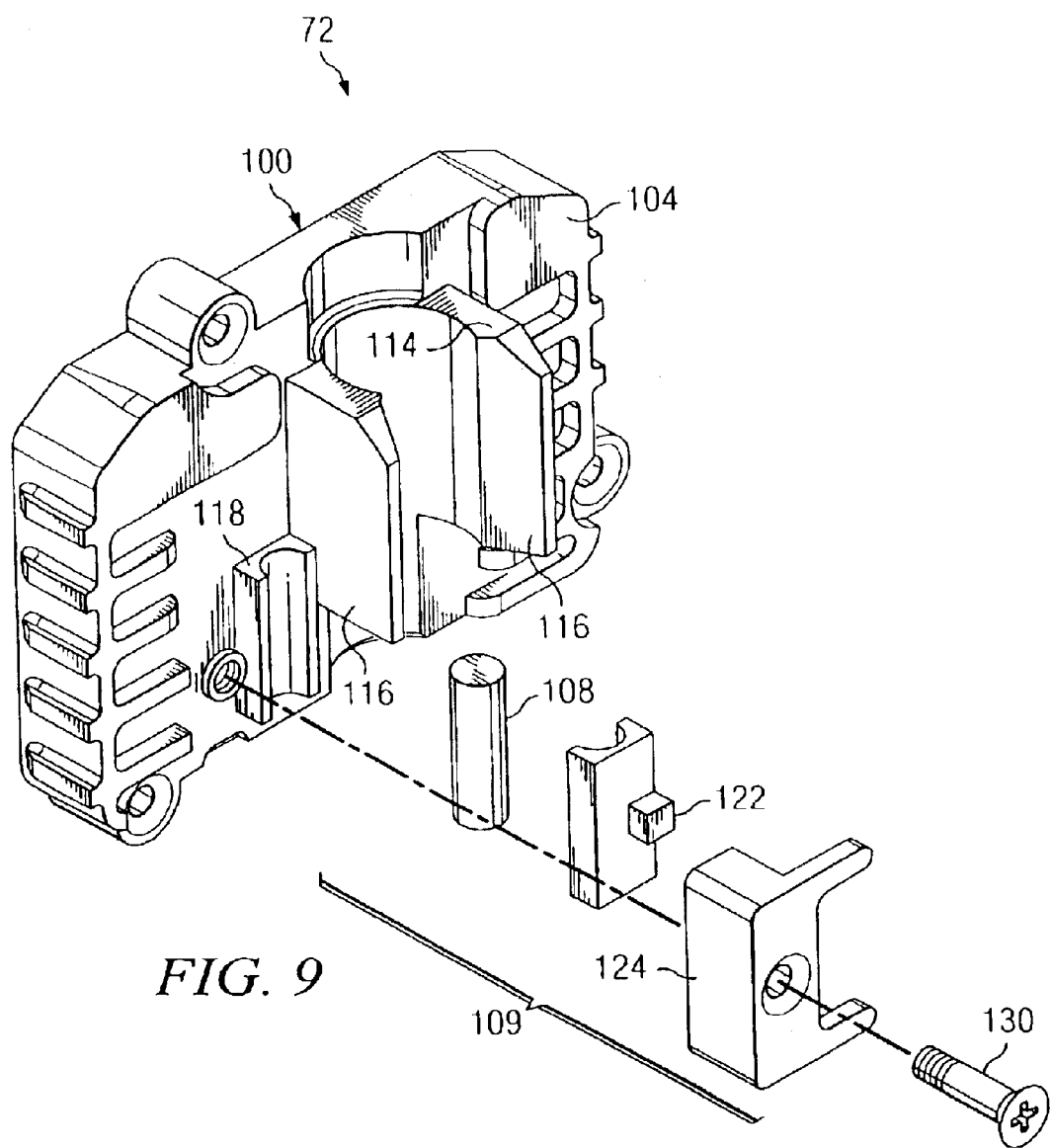
FIG. 9 illustrates a rear perspective view of a second embodiment of a dial assembly with magnetic calibration feature designed according to the present invention.
Figure 10:
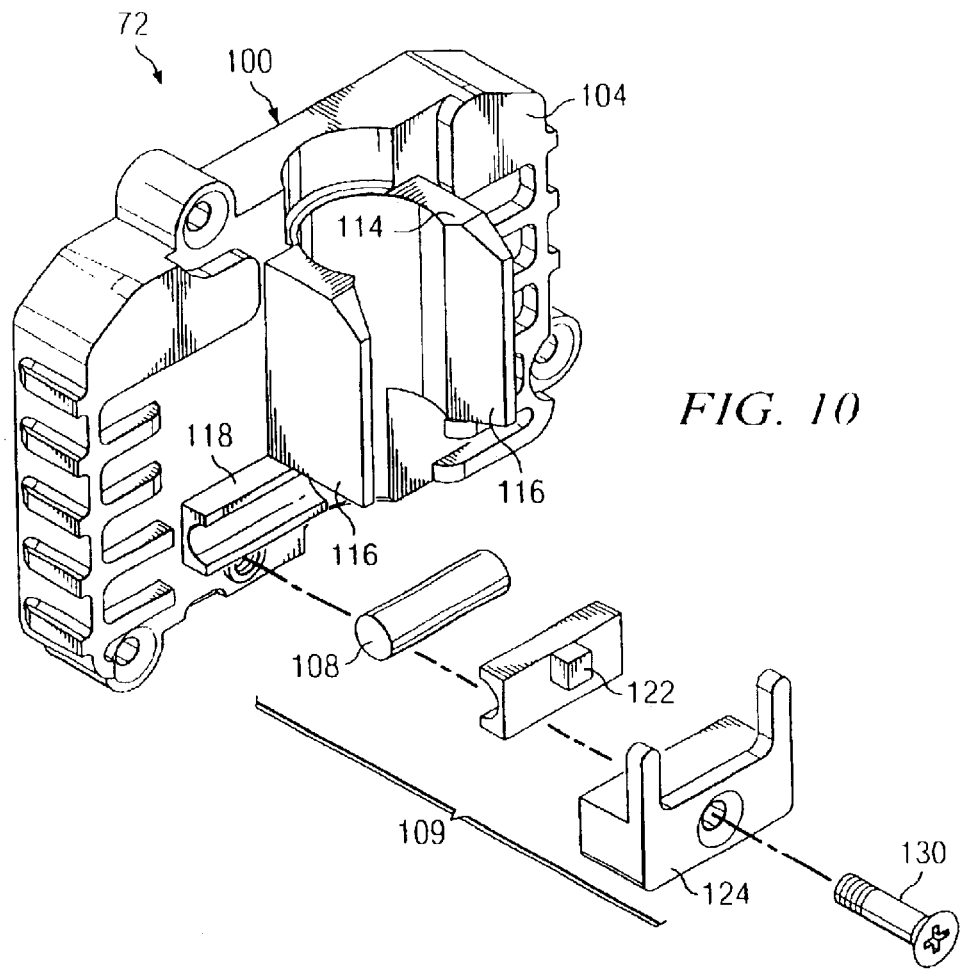
FIG. 10 illustrates a rear perspective view of a third embodiment of a dial assembly with magnetic calibration feature designed according to the present invention.

According to the first embodiment of the dial assembly with magnetic calibration feature 72 illustrated in FIGS. 7 and 8, the calibration magnet is a substantially flat "wafer" magnet having a diameter larger than the thickness and a circular cross-section with a central axis defined through a central opening 142 therein. Operatively, the calibration magnet 108 according to the first embodiment of the dial assembly 72 rotates about its central axis thereby inducing a resulting rotation in the pointer magnet 84 and thereby a movement of the pointer 82 relative to the volume indicia 112 on the dial face 110. However, according to a second embodiment of a dial assembly with magnetic calibration feature 152 illustrated in FIG. 9 and a third embodiment of a dial assembly with magnetic calibration feature 162 illustrated in FIG. 10, the calibration magnet 108 could instead be a bar or cylindrical magnet. The calibration magnet according to the second and third embodiments 152, and 162, respectively, is positionable within a recessed channel 118 defined in the casing 100 magnetically adjacent the pointer magnet (84 illustrated in previous figures), whereby operatively, a linear movement of the calibration magnet 108 would induce a rotational movement on the pointer magnet 84 and thereby a resulting rotational movement of the pointer 82 relative to volume indicia on the dial face. Additionally, features common to all embodiments are also illustrated and enumerated in FIGS. 9 and 10 for reference only and a discussion of these elements is not repeated herein. Further, references to features common to all embodiments but not illustrated in FIGS. 9 and 10 are made in the discussion of FIGS. 9 and 10 for clarity.

Figure 11:
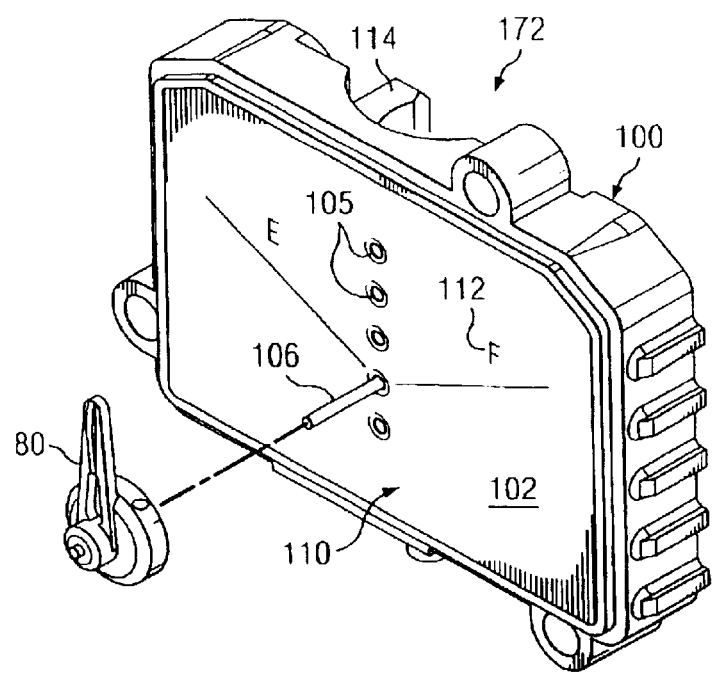
FIG. 11 illustrates a fourth embodiment of a dial assembly with magnetic calibration feature having an adjustable pointer position on a dial face.

A fourth embodiment of a dial assembly with magnetic calibration feature 172 is illustrated in FIG. 11. As above, for clarity, reference to features common to all embodiments are made in the discussion but are not illustrated in FIG. 11. According to the fourth embodiment, a position of the pivot pin 106 is adjustable on the dial face 110 by insertion in any of a variety of pivot pin holes 105 defined in the dial face 110 of the casing 100. When the dial assembly 172 is operative as part of a complete gauge assembly 70, repositioning the pivot pin 106 into a different one of the pivot pin holes 105 effectively repositions the pointer magnet 84 relative to the lift magnet 96 in the passageway 90 of the gauge head 78. Repositioning the pivot pin 106 into a different pivot pin hole 105 would also affect the position of the pointer 82 relative to the volume indicia 112 on the dial face 10, and thereby alter the effective range of motion of the pointer. Additionally, repositioning the pivot pin 106 (and thereby the pointer magnet 84 coupled thereon) would likewise affect the positional relationship between the pointer magnet 84 and the calibration magnet 108 (and thereby the magnetic strength of the calibration magnet 108 on the pointer magnet 84), and thereby the calibration magnet's ability to adjust the position of the pointer.

A fifth embodiment of a dial assembly with magnetic calibration feature 182 is illustrated in FIGS. 12 and 13. Once again, for clarity, reference to features common to all embodiments are made in the discussion but are not illustrated in FIGS. 12 and 13. According to the fifth embodiment, a finer adjustment of the position of the pointer assembly 80 is accomplished by coupling a pivot pin 106 to a carriage 184 defining a threaded passageway 185 for receiving a cooperatively threaded rod 186. A channel 188 defined in the casing 100 receives the carriage 184 and provides a path 190 along the dial face of the casing 100 for movement of the outwardly extending pivot pin 106 as the carriage 184 rides within the channel 188. As the threaded rod 186 is turned by rotation of a head portion 192 of the threaded rod 186, the carriage 184 moves axially along the threaded rod 186 within the channel 188, and the outwardly extending pivot pin 106 is thereby raised or lowered in relation to the dial face 110 and relative to a position of a lift magnet or a calibration magnet assembly. This adjustable pivot pin can be used by itself or in combination with either a fixed calibration magnet or a moveable calibration magnet.

As will be appreciated by those skilled in the art, a number of variations of the magnetic calibration feature may be employed and without deviating from the scope and spirit of the invention. Further, while a particular dial casing shape has been illustrated, it will be appreciated by those skilled in the art that other shapes could be employed without adversely affecting the operation of the dial assembly. Further, while a particular securing means has been disclosed for securing the dial assembly to a gauge head, it will be appreciated by those skilled in the art that any number of other securing means or arrangements could instead be employed. Additionally, while adjustment means for adjusting a position of the pivot pin and thereby the pointer in relation to the dial face have been disclosed, it will be appreciated by those skilled in the art that other methods of repositioning the pivot pin can be employed.

What is claimed is:

1. A dial assembly for a liquid level gauge comprising:
   (a) a base having first and second sides;
   (b) a pivot pin extending from the first side of said base;
   (c) a pointer assembly pivotal about said pivot pin and including a pointer magnet; and
   (d) a calibration magnet movably attached to said base and positioned operatively adjacent to said pointer magnet such that repositioning of said calibration magnet induces a change of position in said pointer magnet.

2. A dial assembly according to claim 1, further comprising:
   (e) an attachment device on the second side of the base.

3. A dial assembly according to claim 2, wherein said attachment device projects outward from said base and operates by means of friction fit.

4. A dial assembly according to claim 1, further comprising:
   (e) an adjustment mechanism cooperatively associated with said calibration magnet, said adjustment mechanism positioned such that the adjustment mechanism is accessible when said dial assembly is installed on the vessel.

5. A dial assembly according to claim 1, further comprising:
   (e) a dial face located between said base and said pointer assembly, said dial face including volume indicia thereon, said pointer assembly including a pointer pivotally mounted on said pivot pin, said pointer being operatively cooperative with said pointer magnet such that a repositioning of said pointer magnet repositions said pointer relative to said volume indicia on said dial face.

6. A dial assembly according to claim 1, further comprising:
   (e) a gauge crystal, positionable about said first side of said base such that said pointer assembly is enclosed between said gauge crystal and said base yet remains viewable through said gauge crystal.

7. A dial assembly according to claim 4,
   wherein a recess is disposed in said second side of said base, and
   wherein said adjustment mechanism and said calibration magnet are positioned on said second side of said base opposite said pointer assembly.

8. A dial assembly according to claim 1,
   wherein a rotation of said calibration magnet induces a rotation of said pointer magnet.

9. A dial assembly according to claim 1,
   wherein a linear movement of said calibration magnet induces a rotation of said pointer magnet.

10. A dial assembly according to claim 1, wherein a position of said pivot pin is adjustable on said base.

11. A gauge assembly comprising:
    (a) a float assembly having:
        (1) a head defining a passageway;
        (2) a lift rod having a first end and a second end, said lift rod being moveable within said passageway of said head;
        (3) a lift magnet attached at the first end of said lift rod;
        (4) a float coupled to said second end of said lift rod;
    (b) a dial assembly adapted to be positioned about said head adjacent said passageway of said head, said dial assembly comprising:
        (1) a base having first and second sides;
        (2) a pivot pin extending from the first side of said base;
        (3) a pointer assembly pivotal about said pivot pin and including a pointer and pointer magnet; and
        (4) a calibration magnet movably attached to said base and positioned operatively adjacent said pointer magnet such that repositioning of said calibration magnet induces a change of position in said pointer magnet.

12. A gauge assembly according to claim 11, wherein the dial assembly further comprises:
    (5) an attachment device on the second side of the base for securing the dial assembly about the head.

13. A gauge assembly according to claim 11, wherein said attachment device projects outward from said base and operates by means of friction fit.

14. A gauge assembly according to claim 11, wherein said dial assembly further comprises:
    (5) an adjustment mechanism cooperatively associated with said calibration magnet, said adjustment mechanism positioned such that the adjustment mechanism is accessible when said dial assembly is installed on the vessel.

15. A gauge assembly according to claim 11, wherein said dial assembly further comprises:
    (5) a dial face located between said base and said pointer assembly said dial face including volume indicia thereon, said pointer being operatively cooperative with said pointer magnet such that a repositioning of said pointer magnet repositions said pointer relative to said volume indicia on said dial face.

16. A gauge assembly according to claim 11, wherein said dial assembly further comprises:
    (5) a gauge crystal, positionable about said first side of said base such that said pointer assembly is enclosed between said gauge crystal and said base yet remains viewable through said gauge crystal.

17. A gauge assembly according to claim 14,
    wherein a recess is disposed in said second side of said base of said dial assembly, and
    wherein said adjustment mechanism and said calibration magnet are positioned on said second side of said base opposite said pointer assembly.

18. A gauge assembly according to claim 11,
    wherein a rotation of said calibration magnet induces a rotation of said pointer magnet.

19. A gauge assembly according to claim 11,
    wherein a linear movement of said calibration magnet induces a rotation of said pointer magnet.

20. A gauge assembly according to claim 11, wherein a position of said pivot pin of said dial assembly is adjustable on said base.

21. A gauge assembly for measuring a fluid level in a vessel, said gauge assembly comprising:
    (a) float assembly comprising:
        (1) a head defining a passageway;
        (2) a lift rod, said lift rod having a first end and a second end, said first end of said lift rod being moveable within said passageway of said head
        (3) a first magnet attached to said first end of said lift rod, such that said first magnet is moveable within said passageway of said head;
        (4) a float attached to said second end of said lift rod such that a change in fluid level within the vessel adjusts a position of the float and thereby a position of the lift magnet within said passageway, (b) a dial assembly adapted to be secured to said head adjacent said passageway, said dial assembly comprising:
  (1) a base having a pivot pin, said base also having an attachment device for engaging the head, and
  (2) a pointer assembly comprising a second magnet attached to an indicating arm, which is pivotally attached to said pivot pin;
  (3) a dial face located between said base and said pointer assembly, said dial face having volume indicia,
  (4) said second magnet movable in response to changes in position of said first magnet contained within said passageway of said head, and
  (5) a third magnet magnetically coupled to said second magnet, such that a movement in said third magnet induces a movement in said second magnet.

22. A gauge assembly according to claim 21, wherein said dial assembly further comprises:
  (6) an adjustment feature cooperatively associated with said third magnet, said adjustment feature positioned with respect to said dial assembly such that the adjustment feature is accessible when said dial assembly is coupled to head and installed on the vessel.

23. A gauge assembly according to claim 22, wherein a movement of said adjustment feature moves said third magnet, and wherein a movement of said third magnet induces a rotation in said second magnet thereby repositioning the indicating arm relative to the volume indicia on the dial face.

24. A gauge assembly according to claim 21, wherein said dial assembly further includes
  (6) an attachment feature on a second side of said base, said attachment feature for attaching the dial assembly to the head.

25. A dial assembly comprising:
  (a) a base having first and second sides;
  (b) a pivot pin extending from the first side of said base; and
  (c) a pointer assembly pivotal about said pivot pin and including a pointer magnet;
  wherein said pivot pin position is adjustable with respect to said base.

26. A dial assembly according to claim 25,
  wherein said base defines a plurality of pivot pin holes, and
  wherein said pivot pin is insertable within any one of said plurality of pivot pin holes.

27. A dial assembly according to claim 25,
  wherein a rotation of a screw moves said pivot pin with respect to said base.

28. A dial assembly according to claim 27, wherein said pivot pin is coupled to a carriage and said carriage moves in relation to the rotation of the screw.

29. A dial assembly according to claim 25, further including:
  (d) a calibration magnet attached to said base and positioned adjacent to said pointer magnet.

* * * * *